Aug. 13, 1968   J. KOLBE   3,396,989
WELD-FABRICATED STRUCTURAL MEMBER
Filed Dec. 13, 1965
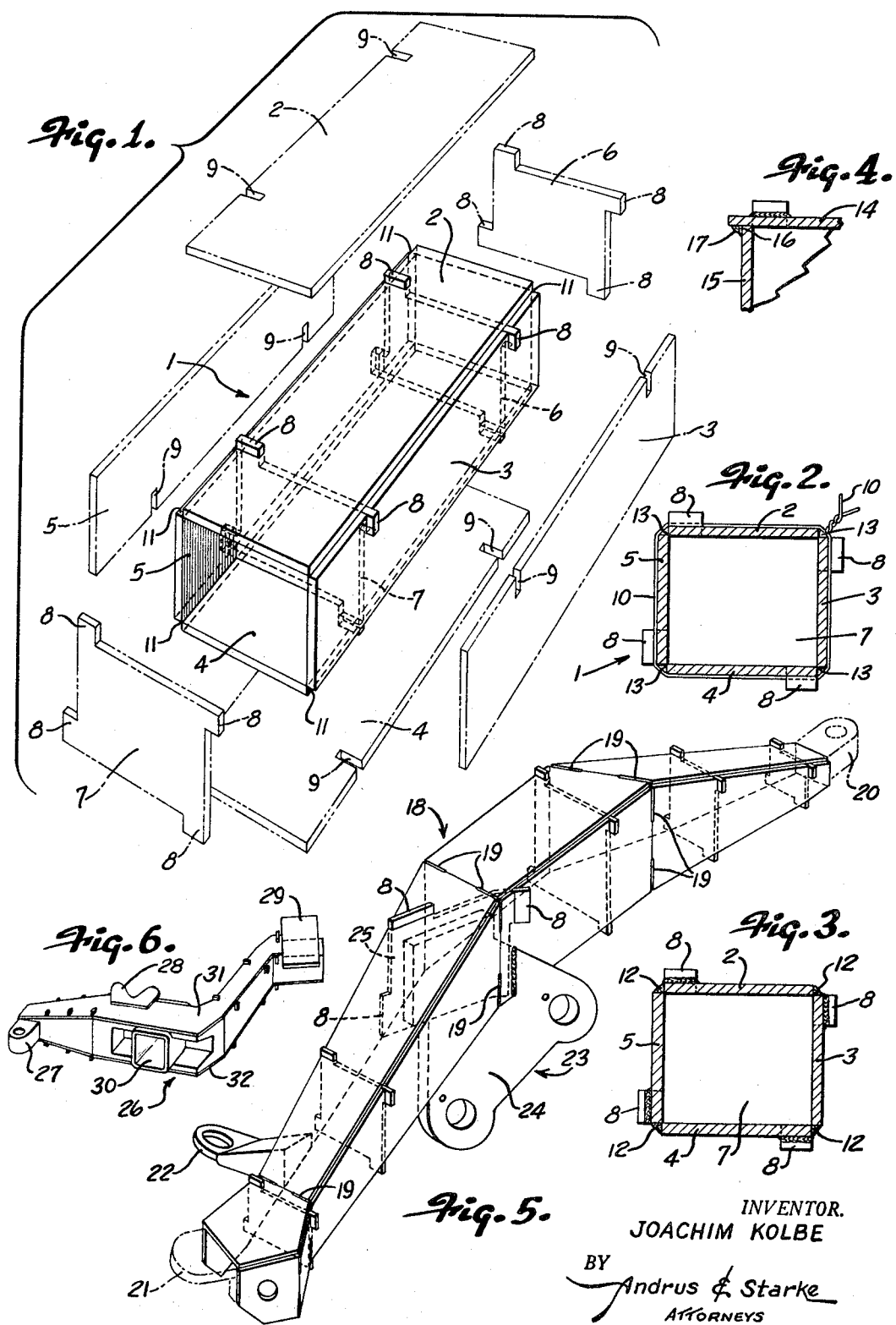
INVENTOR.
JOACHIM KOLBE
BY Andrus & Starke
ATTORNEYS

United States Patent Office

3,396,989
Patented Aug. 13, 1968

3,396,989
WELD-FABRICATED STRUCTURAL MEMBER
Joachim Kolbe, 5126 Haskell Ave.,
Encino, Calif. 91316
Filed Dec. 13, 1965, Ser. No. 513,323
9 Claims. (Cl. 280—106)

ABSTRACT OF THE DISCLOSURE

A strut or other hollow structure member is constructed without the necessity of jigs and fixtures from plate stock cut to provide top, bottom and side enclosure plates welded together at the longitudinal corners. At least two of the plates extend for the full length of the strut and spacer plates are disposed transversely of the strut at a plurality of locations therealong with each spacer plate provided with a tongue or projection extending through a corresponding slot in each plate and welded in place. The subassembly of the enclosure plates and the spacer plates prior to welding is rigid and self supporting and may be secured temporarily by one or more peripheral bands applied thereto.

---

This invention relates to a weld fabricated structural member having various uses and particularly adapted for do-it-yourself and small individual production operations as distinguished from large volume mass production operations.

The invention has been applied to the construction of suspension arms of automobiles where it makes possible the individual construction of such arms at a cost more nearly comparable to mass produced forged and cast arms generally used in the trade.

The invention finds present use in the construction of such vehicle suspension arms for converting standard automobiles into special sport cars having the ability to bank on turns. In such use individual car owners can more readily construct the necessary suspension arms at a very substantial saving over the production of cast or forged arms.

The invention has many other uses in the construction field and finds considerable advantage in airplane construction where lightweight members of substantial strength are needed.

In carrying out the invention the arm or structural member is made up of three or more enclosure plates arranged edge to edge at an angle and extending for the full length of the member, and a plurality of transverse spacer plates distributed along the member and serving to support the enclosure plates in final arrangement.

Rigidity of the plate assembly is provided by means of extensions upon the spacer plates fitting into corresponding slots in the enclosure plates, and which are welded preferably by fusion welding to the enclosure plates. In addition the enclosure plates are welded to each other along their common edges preferably by fillet fusion welds.

The plates may be readily cut from plate metal by a band saw which is usually part of the tool equipment of many homes, and the manual assembly is just as simple. When the parts have been assembled they may be temporarily secured by means of one or more wires tightened around the periphery of the member prior to welding.

The accompanying drawings illustrate application of the invention to a strut of box-like shape and to front and rear suspension arms for a banking car.

In the drawings:

FIGURE 1 is a perspective view of a box section strut or link, with the enclosing and spacer plates additionally shown in dotted spaced relation prior to assembly;

FIG. 2 is a transverse section of the link shown in FIG. 1 and illustrating the assembly after application of the temporary holding wire thereto;

FIG. 3 is a transverse section similar to FIG. 2 after welding of the plates;

FIG. 4 is a detail section of one corner of the structure showing a modified type of welded joint between the plates;

FIG. 5 is a perspective view of a selected suspension link or arm for the front suspension of a curve-bank car; and FIG. 6 is a perspective view of a selected suspension link or arm for the rear suspension of a curve bank car.

The drawings in general illustrate linkage comprising enclosing plates and spacer plates with interlocking arrangements formed by the two kinds of plates according to the invention.

FIG. 1 illustrates a box section link 1 comprising four enclosing plates 2, 3, 4 and 5 and two spacer plates 6 and 7. Both enclosing plates and spacer plates are shown in FIG. 1 before and after assembly and have been given identical numerals. The spacer plates 6 and 7 are outlined to carry on each corner a tongue-like protrusion 8. The enclosure plates 2 to 5 are provided with slots 9 located to extend over the corresponding protrusions 8 which are preferably of sufficient length to furnish link outside surfaces for the placing of weld seams, and sufficient width to resist diagonal shifting between two neighboring enclosure plates.

A further characteristic of the spacer plate protrusions is their alignment, each starting with the outer outline of one side of the spacer plate and extending inwardly along the corresponding outer outline of the neighboring side of the spacer plate. This arrangement makes possible easy assembly and clearance-free overlapping of the enclosure plates over the spacer plates, securing a tight, deformation-resisting structure, as soon as wire loops 10, as shown in FIG. 2, are applied, spaced at selected distances.

The assembly shown in FIG. 1 will, after wiring, keep the enclosure plates 2 to 5 firmly in place resisting movement relative to each other in any direction and thereby form a most favorable basis for welding without undue deformation and without the use of separate welding fixtures. The edge recesses 11 between the enclosure plates form suitable locations or grooves for the fillet weld seams 12, which will weld the protrusions 8 to any desirable extent directly from the outside into the structure. The spacer plates 6 and 7 which carry the protrusions 8 will thereby become important reinforcements of the structure itself. The weld around each protrusion will act similar to a nut threaded upon a bolt even where the weld bond is not complete, or even cracked.

A bamboo-like structure will result, wherein gain in strength due to the welded-in spacer plates will permit reduction in weight and gauge of material needed for a desired strength of the link and reduction in time needed to cut and slot the plates.

FIG. 2 illustrates clearly the line-up between enclosure plates 2 to 5, the corresponding protrusions 8 forming a part of the spacer plates such as plate 7, and the proposed location of the loop-wire 10 and the application of the weld seams 12.

A link structure as illustrated in FIGS. 1 and 2 and described above will frequently form a hollow beam or a hull-like carrier for a number of attachment-brackets when used in the automotive vehicle or aircraft field.

In FIGS. 2 and 3 the assembly shows the enclosure plates meeting at the corners with a right angle groove 13 formed by their edges for receiving the fillet welds 12.

In FIG. 4, the modified construction shows one of the enclosure plates 14 extending outwardly across the edge of the adjacent enclosure plate 15 and providing a right angle groove 16 between the plates for receiving a fillet weld 17. Various modifications of joints may be employed.

FIG. 5 illustrates the application of a composite structure 18 based on enclosure and spacer-plates to an automobile front suspension link. The enclosure plates have been bent about substantially crosswise precut bendslots 19. The structure 18 carries a ball joint stud support 20 on its inner end, a ball joint enclosure support 21 on its outer end, a shackle support 22 on its forward surface and a hinge support 23 located intermediate the length of the link and comprising a carrier plate 24, welded to and protruding from a typical spacer plate 25 with its corner protrusions 8 intersecting the main linkage hull and welded into it in accordance with the invention. Where plate 23 intersects the hull, welds can additionally be applied from the outside.

FIG. 6 illustrates the application of a composite structure 26 comprising enclosure and spacer plates in accordance with the invention to an automobile rear suspension link carrying a ball joint stud 27 and ball joint support plate 28 and a rubber cushion support plate 29 and a square-tube spring anchor 30 for the insertion of leaf springs (not shown). The top and bottom enclosure plates 31 and 32 are extending with their full length from the ball stud carrier 27 to the rubber cushion support plate 29 forming a 90° angle outline for the structure 26 and securing a firm alignment position for all attachments. The spacer plates are preferably located to give the attachments additional support and to indicate their positioning to the "do-it-yourself" builder.

Various modes of carrying out the invention are contemplated as being within the scope of the following claims particularly pointing out and distinctly claiming the subject matter which is regarded as the invention.

I claim:

1. A structural member of the class described capable of fabrication without the need of welding fixtures and the like, comprising three or more enclosure plates arranged to provide a box-like enclosure with the side edges of adjacent plates meeting and at least two of which plates extend for substantially the full length of the member, a plurality of spacer plates disposed transversely of said enclosure plates to support the same in assembled relation, means separately interlocking said spacer plates with each said enclosure plate and comprising projections on the edges and adjacent the corners of said spacer plates extending through corresponding slots in the enclosure plates to provide a rigid subassembly for welding without the necessity of employing fixtures.

2. The member of claim 1 and a band extending around the member and tightened upon said enclosure plates to hold the assembly rigidly together for welding.

3. The member of claim 1 and fillet fusion welds at the corners of the structure between and joining adjacent enclosure plates.

4. The member of claim 1 and fusion welds of said projections in said slots.

5. The member of claim 4 and additional fillet fusion welds at the corners of the structure between adjacent enclosure plates.

6. A structural member according to claim 5 and additionally comprising a solid section pivot carrier welded to adjacent enclosure and spacer plates.

7. A structural member according to claim 6 and additionally comprising a rectangular tubular leaf spring anchor disposed generally transversely through the member and welded thereto.

8. A method of do-it-yourself manufacture of box section structural members of substantial strength according to claim 5, comprising sawing enclosure plates and spacer plates from flat plate metal stock, assembling said plates with edge projections on said spacer plates extending through corresponding slots in said enclosure plates, and with the enclosure plates meeting along adjacent longitudinal edge portions, at least two of the enclosure plates extending the full length of the structural member, and welding the enclosure plates along their corresponding longitudinal edges.

9. The method of claim 8 and the step of temporarily securing the assembly together by one or more peripheral bands prior to welding.

References Cited

UNITED STATES PATENTS

| 2,297,123 | 9/1942 | Almdale | 280—106 |
| 2,298,452 | 10/1942 | Barker | 217—68 |
| 3,101,819 | 3/1960 | Shinn | 280—106 |

FOREIGN PATENTS

| 921,439 | 1/1947 | France. |
| 542,350 | 1/1942 | Great Britain. |
| 718,134 | 11/1954 | Great Britain. |

PHILIP GOODMAN, *Primary Examiner.*